Dec. 15, 1942.  E. S. CLEMENS  2,305,408
WATER RECLAIMER
Filed Aug. 21, 1940  3 Sheets-Sheet 2
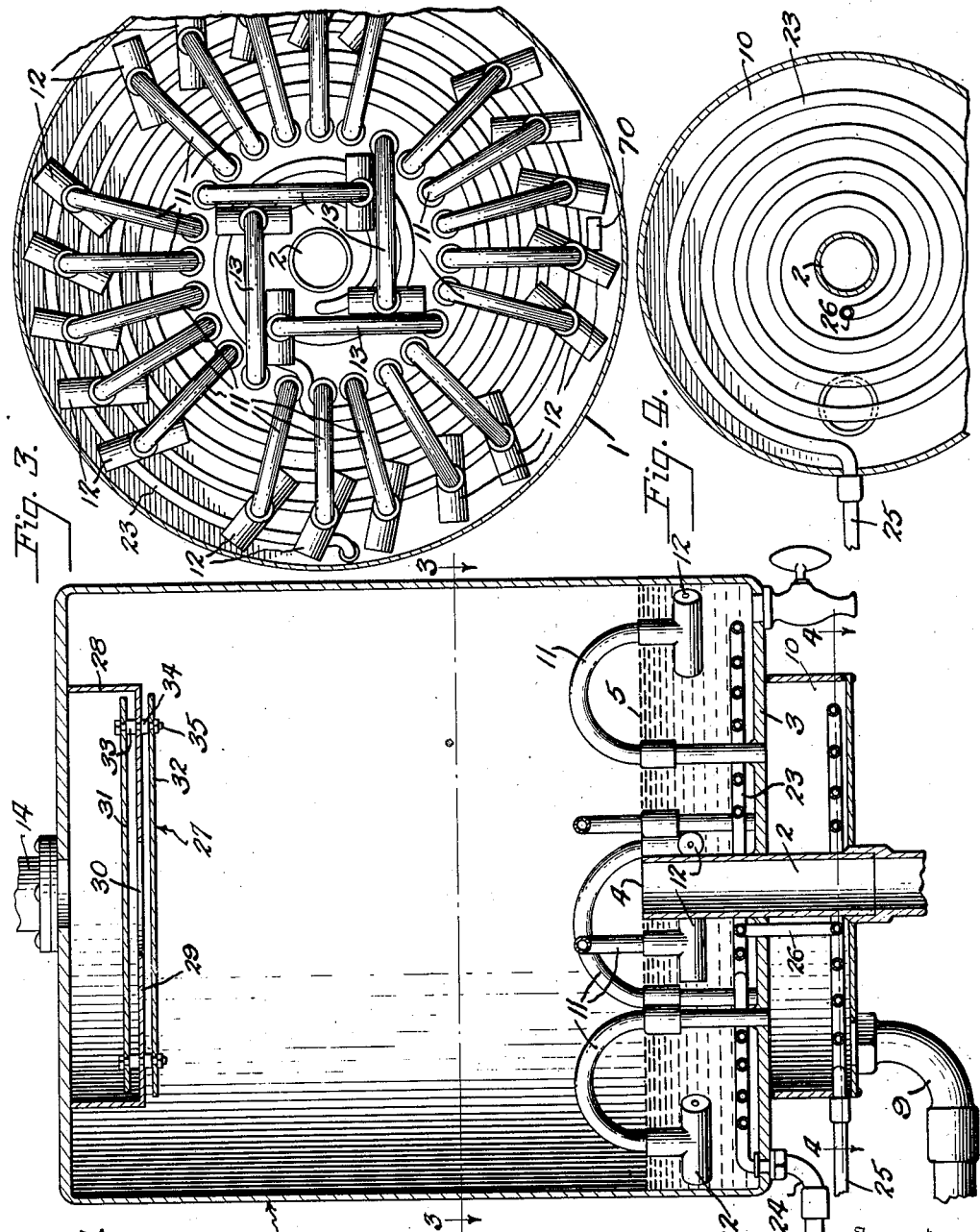
Inventor
E. S. Clemens
By Mason Fenwick & Lawrence
Attorneys Dec. 15, 1942. E. S. CLEMENS 2,305,408
WATER RECLAIMER
Filed Aug. 21, 1940 3 Sheets-Sheet 3

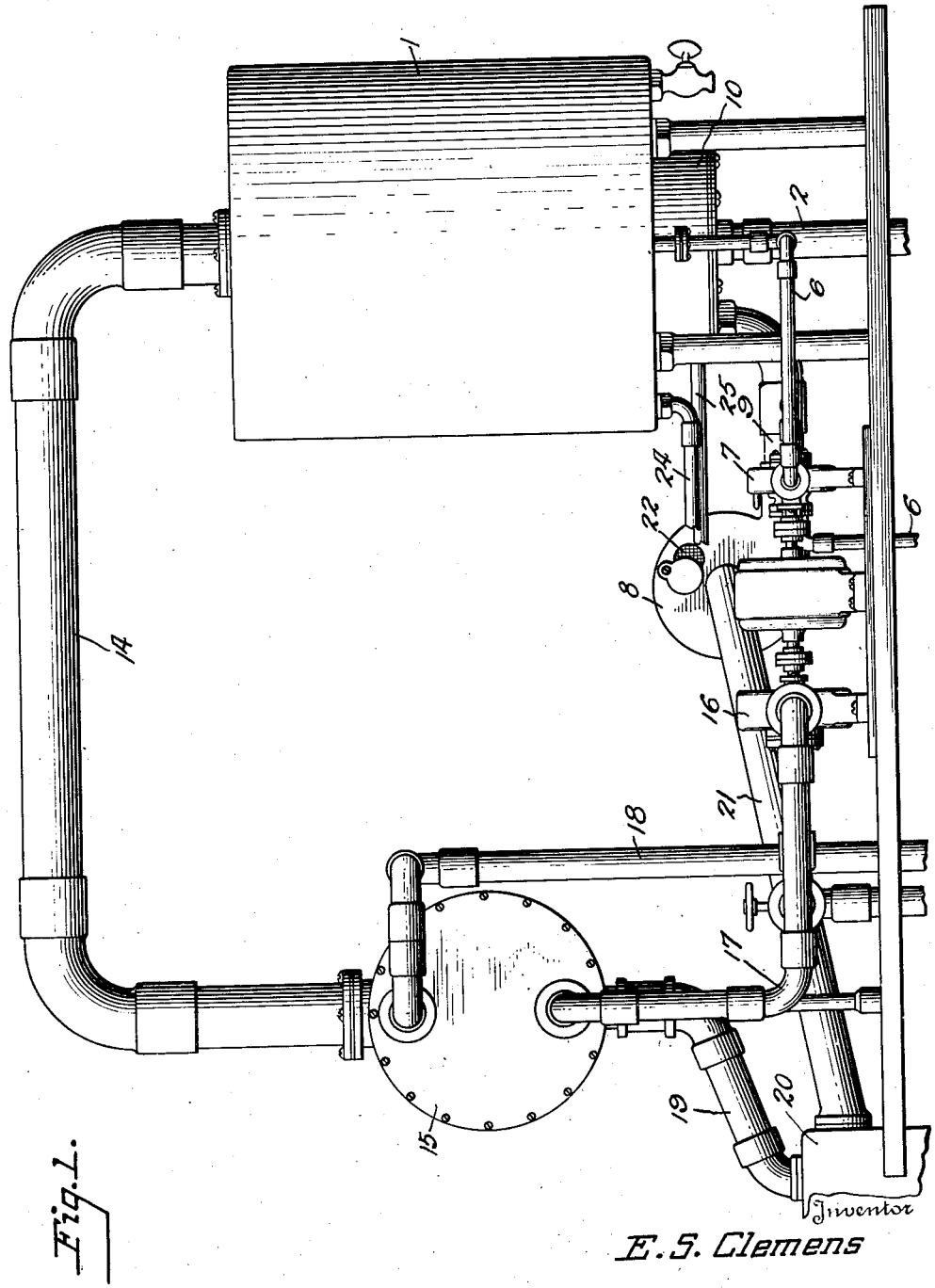

Inventor
E. S. Clemens
By Mason Fenwick & Lawrence
Attorneys

Patented Dec. 15, 1942

2,305,408

UNITED STATES PATENT OFFICE 2,305,408

WATER RECLAIMER

Edwin S. Clemens, New Orleans, La., assignor to Water Reclaimer Corporation, Mobile, Ala., a corporation of Alabama Application August 21, 1940, Serial No. 353,557

5 Claims. (Cl. 202—201)

This invention relates to a water reclaiming apparatus, and it has for its object the economical extraction of pure water from water which is biologically, organically or inorganically impure or contaminated.

The invention operates upon the principle of evaporating water in contact with air, thereby saturating the air with the water vapor, and then condensing the water out of the air. The evaporation of the water and the saturation of the air takes place at temperatures below the atmospheric boiling point of water, both for the sake of economy and to prevent the breaking down or volatilization of the contaminating matters of the impure water.

The purpose of the invention is to obtain pure water from any available source of raw water, for feeding boilers, etc., as well as for drinking purposes.

One of the objects of the invention is to provide a water reclaiming system in which a column of air heated to a point well below the atmospheric boiling point of water is recirculated, for the sake of heat conservation, between a body of impure water from which the pure water is to be reclaimed, and a condenser, bubbling through the impure water in the form of a plurality of streams or jets by which its surface contact with the water is many times multiplied, and becoming saturated with water vapor which is condensed out from the air in the condenser and collected in a suitable storage vessel.

Another object of the invention is to provide that the body of impure water through which the recirculating air percolates shall also be heated to a temperature below its atmospheric boiling point, and supplied with sufficient make-up water to compensate for depletion by evaporation and also to provide an optimum small waste or overflow to prevent raising of the density of the water body through concentration of salts or other impurities.

A further object of the invention is to provide water reclaiming apparatus, including a tank, in the lower part of which the saturating function incident to gas and liquid contact between the air and impure water is performed, there being a baffle construction in the upper part controlling the moist air outlet to the condenser, so as to abruptly change both the direction and velocity of the column of moisture laden air approaching the outlet, for the purpose of ridding the air of any liquid particle or impure water that might otherwise be drawn over into the condenser and in admixture with the pure water.

Other objects of the invention will appear as the following description of a preferred and practical embodiment thereof proceeds.

In the drawings which accompany and form a part of the following specification, and throughout the several figures of which the same characters of reference have been employed to designate identical parts:

Figure 1 is a longitudinal elevation showing a water reclaiming system embodying the principles of the present invention;

Figure 2 is a vertical section through the reclaiming tank;

Figure 3 is a cross-section taken along the line 3—3 of Figure 2;

Figure 4 is a cross-section taken along the line 4—4 of Figure 2; and

Figure 5:
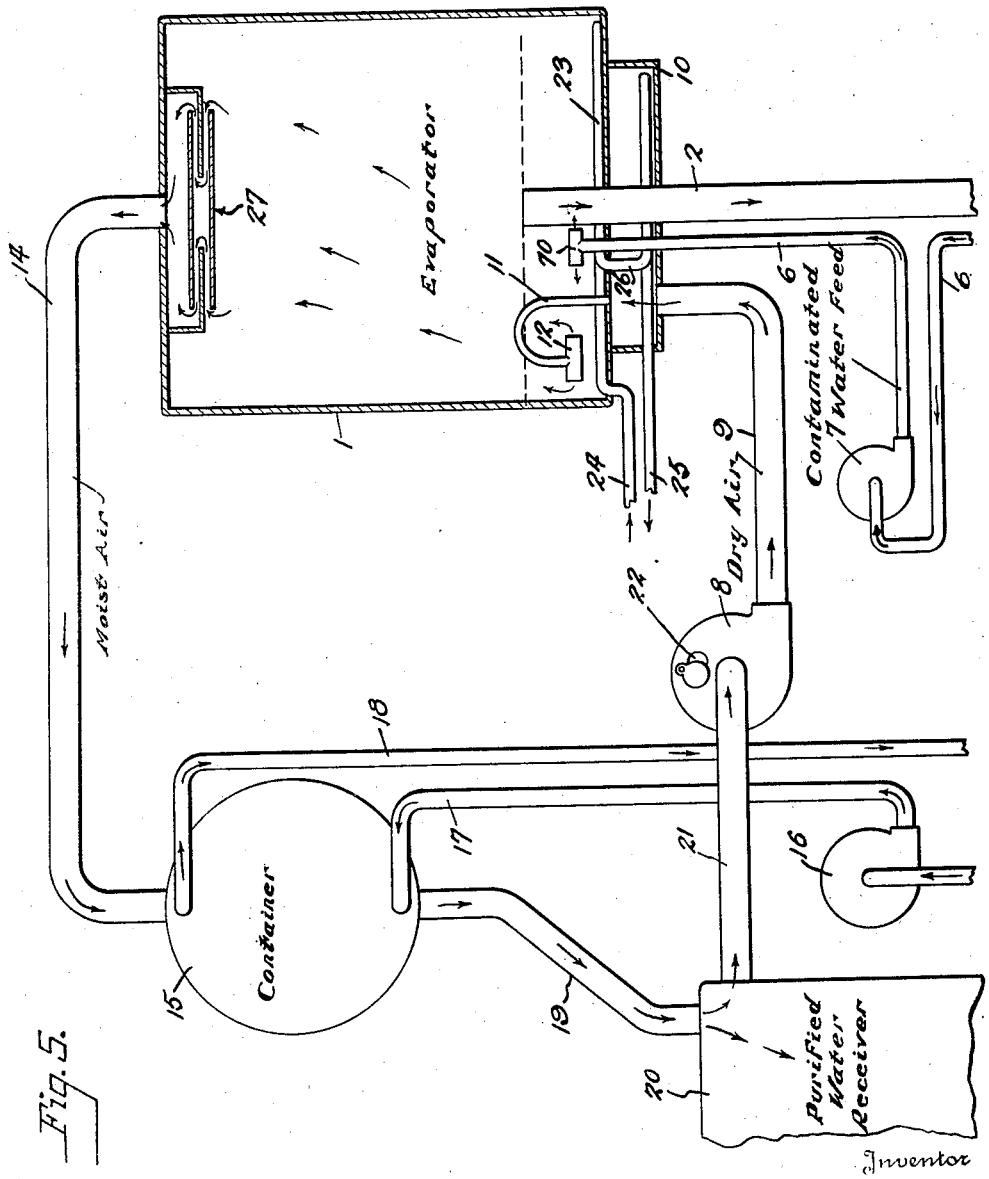
Figure 5 is a longitudinal diagrammatic layout of the system.

Referring now in detail to the several figures, the numeral 1 represents in general a tank closed excepting as regards its communication with certain conduits, as will appear. Said tank is provided with an overflow pipe 2 extending through the bottom wall 3 of the tank and the upper open end 4 of which determines a constant water level 5 within the lower portion of the tank 1. The overflow pipe 2 wastes into a sewer or other suitable depository, such for instance as the sea, in the event that the apparatus is installed upon a boat.

Impure water for reclamation purposes is obtained from a suitable source by way of the conduit 6, from which source it is drawn by the pump 7 and discharge into the tank 1 into the water body therein below the water level 5. As shown in Figures 3 and 5, the impure water supply pipe 6 debouches into the water body within the tank 1 in opposite circumferential directions from the ends of the T-head 70 at the inner end of the supply pipe 6. The circumferentially directed jets issuing from this T-head create agitation throughout the water body, and prevent the settling of mud, etc., at the bottom of the tank 1.

Air is supplied to the tank 1 by a blower 8, communicating by way of a conduit 9 with an air header 10 positioned beneath the tank 1 and preferably in contact with the bottom thereof. As shown, the air header is concentric with the axis of the tank 1, so that the overflow pipe 2 extends through it. The air header communicates with the interior of the tank 1 by means of a plurality of tubes 11 which extend through the bottom of the tank and have the shape of return bends, extending downwardly below the water level 5 and themselves terminating in perforated T-heads 12 through the perforations of which air issues in an aggregate great multiplicity of fine air streams or jets which bubble up through the water body and diffuse in the chamber of the tank above the water level 5.

The upper end of the tank 1 communicates by way of the conduit 14 with a condenser 15, the tubes of which carry a cooling fluid, preferably cold water, pumped in by the pump 16 through the pipe 17, and being discharged by way of the pipe 18.

It will be understood that the air issuing from the T-heads 12 becomes saturated with water vapor, in passing through the water body in the tank 1, this saturated air passing by way of the conduit 14 to the condenser 15 in which the moisture is condensed and delivered by way of the conduit 19 to the storage tank 20 in the form of pure water, while the air dried in the condenser is delivered once again to the pump 8 by way of the conduit 21 and recirculated through the apparatus. Since in the course of its recirculation the air, at least in some portions of its circulatory path, is under some pressure, there will inevitably be some air leakage which is compensated by make-up air drawn in through the damper controlled port 22 of the pump 8.

It is, of course, desirable from the standpoint of efficient vaporization of the water and saturation of the air, that the water be heated. This heating may be accomplished by any of several heating means, and in the practice of the invention shown is accomplished by means of a steam coil 23 which may be helical, as shown in Figure 3, receiving steam from any conveniently available source by way of the pipe 24, and which steam, or its condensate, is exhausted by way of the pipe 25. The apparatus may be operated most economically, of course, through the use of exhaust steam from any apparatus with which the the water reclaiming apparatus may be associated, such for example as the power plant of a boat. As shown in the drawings, the air is also heated, the steam coil 24 passing from the tank 1 by way of the short connection 26 into the air header 10, in which it is disposed as an expanding helix communicating with the pipe 25. Even though the steam entering the coil 23 may be at or somewhat above the atmospheric boiling point of water, the temperature of the water body will be considerably lower than its atmospheric boiling point, due to the cooling effect of the multiplicity of air jets which percolate through the water body. It will be understood that in certain installations other heating means than steam may be more commercially or accessibly employed, and such are within the purview of the invention.

Inasmuch as economy in the reclaiming of pure water is of the essence of the invention, heat conservation both with respect to the heated air and the heated water, is provided for. By recirculation of the heated air, only enough additional heat is added to compensate for the cooling which the air undergoes in the condenser and the heating of the slight amount of make-up air which enters by way of the port 22. With regard to the water body, only enough make-up water is provided by the pump 7 to compensate for the amount of pure water evaporated, and to provide for an optimum small overflow through the overflow pipe 2, which is to prevent material increase in the density of the water body through concentration of the salts or other impurities therein.

Figure 2 shows that the tank 1 is provided with a baffle construction, which in general is designated by the reference character 27 in Figure 2. Said baffle construction occludes direct communication with the outlet from the tank 1 to the conduit 14 which leads to the condenser. Said baffle construction comprises a cylinder 28 having a lower end wall 29, with a central relatively small aperture 30. Both within and without, said cylinder is provided with parallel discs 31 and 32, the former being somewhat smaller in diameter than the interior of the cylinder 28. Said discs are spaced away from the bottom wall of said cylinder by the spacers 33 and 34, which spacers surround the bolts 35 or other securing means which hold the discs 31 and 32 in place. The exiting moisture laden air must pass first around the periphery of the outer disc 32, then through the relatively small hole in the bottom wall 29, and then around the periphery of the inner disc 31, before it passes into the conduit 14. In being compelled to traverse this circuitous path, the moisture laden air is subjected not only to abrupt direction changes, but also to variations in velocity, assuring that any liquid particles of impure water which may be entrained in said air will be dropped and will not find their way into the condenser and into contaminating mixture with the pure water.

It is to be understood by those skilled in the art that the specific details of construction or the arrangement of parts, as herein shown and described, are by way of example and not to be construed as limiting the scope of the invention as defined in the appended claims.

What I claim as my invention is:

1. In water reclaiming apparatus including a condenser and circulatory means, an evaporator comprising a tank, means for supplying raw water to the tank, means for maintaining a constant level of water in the lower portion of the tank and a plurality of circumferentially arranged air nozzles positioned below the water level and each arranged to discharge obliquely with respect to the adjacent wall, the circulatory means being arranged for forcing relatively dry air from the condenser to said air nozzles and drawing moist air from the top of the tank to the condenser with means for drawing the purified condensate from the condenser.

2. The device of claim 1 in which the air nozzles are all inclined in the same direction with respect to a radius of the tank passing through each and each air nozzle has aligned oppositely disposed vents.

3. The device of claim 1 with means for heating the dry air before reaching the nozzles.

4. The device of claim 1 with a circuitous vent passage arranged to convey entrained matter back into the tank.

5. In water reclaiming apparatus including a condenser and circulatory means, a tank formed with two compartments one above the other, a heating coil arranged with convolutions on the bottoms of each compartment, a plurality of conduits extending through the partition separating the compartments into the upper compartment, said conduits arranged in spaced relation to the side wall of the tank and each formed with a return bend and a nozzle arranged obliquely with respect to the adjacent portion of the tank wall, said nozzles having oppositely disposed discharge orifices, means for supplying raw water to the upper compartment, means for maintaining a constant level of water in said compartment slightly above the discharge nozzles, a conduit leading from the top of the upper compartment to the condenser with means including a circuitous passage arranged to drain back into the upper part of the tank, a conduit leading from the condenser for dry air to the circulatory means and a conduit leading from the circulatory means to the lower compartment.

EDWIN S. CLEMENS.